US007949965B2

(12) United States Patent
Tominaga (10) Patent No.: US 7,949,965 B2
(45) Date of Patent: May 24, 2011

(54) APPARATUS AND METHOD FOR PROCESSING MAP DATA AND STORAGE MEDIUM HAVING INFORMATION FOR CONTROLLING THE PROCESSING OF MAP DATA

(75) Inventor: Hiroyuki Tominaga, Kanagawa (JP)

(73) Assignee: Sony Corporation (JP)

( * ) Notice: Subject to any disclaimer, the term of this patent is extended or adjusted under 35 U.S.C. 154(b) by 755 days.

(21) Appl. No.: 10/203,529

(22) PCT Filed: Dec. 27, 2001

(86) PCT No.: PCT/JP01/11539
§ 371 (c)(1),
(2), (4) Date: Aug. 9, 2002

(87) PCT Pub. No.: WO02/052841
PCT Pub. Date: Jul. 4, 2002

(65) Prior Publication Data
US 2004/0044957 A1 Mar. 4, 2004

(30) Foreign Application Priority Data
Dec. 27, 2000 (JP) ................................ 2000-398534

(51) Int. Cl.
*G06F 3/14* (2006.01)
*G01C 21/30* (2006.01)
*H04W 24/00* (2009.01)

(52) U.S. Cl. ........ 715/864; 715/764; 715/866; 701/208; 701/212; 701/213; 455/457; 382/106; 382/113

(58) Field of Classification Search .................. 715/733, 715/810, 835, 864, 866, 762–765; 340/990, 340/995; 701/200, 208, 212, 213; 382/106, 113; 455/457
See application file for complete search history.

(56) References Cited

U.S. PATENT DOCUMENTS
5,027,302 A * 6/1991 Asanuma et al. ............... 701/48
5,353,034 A * 10/1994 Sato et al. ..................... 342/457
(Continued)

FOREIGN PATENT DOCUMENTS
EP 1 024 347 A1 2/2000
(Continued)

OTHER PUBLICATIONS
Ma et al., A Framework for Adaptive Content Delivery in Heterogeneous Network Environments, XP-002168331.
(Continued)

*Primary Examiner* — Tadeese Hailu
(74) *Attorney, Agent, or Firm* — Lerner, David, Littenberg, Krumholz & Mentlik, LLP (57) ABSTRACT

An information processing apparatus for displaying a map, displaying any data related to position information on the map, and effectively using the same even if map information is not provided in the information processing apparatus is disclosed. Image data and additional information having link information to the position information and a map are linked and stored in a memory stick 140. At the time of display, the apparatus accesses the Internet by a mobile phone 150 based on the link information, acquires the map information, and displays it on an LCD 131. It displays marks based on the position information on the map. For example when the mark is selected etc., it reads image data and further displays it on the LCD 131.

18 Claims, 7 Drawing Sheets

U.S. PATENT DOCUMENTS

| | | | |
|---|---|---|---|
| 5,488,558 A * | 1/1996 | Ohki | 701/207 |
| 5,923,786 A * | 7/1999 | Murayama | 382/242 |
| 6,037,936 A * | 3/2000 | Ellenby et al. | 715/764 |
| 6,083,353 A * | 7/2000 | Alexander, Jr. | 202/158 |
| 6,133,947 A | 10/2000 | MiKuni | |
| 6,151,017 A * | 11/2000 | Suzuoka et al. | 715/201 |
| 6,178,377 B1 * | 1/2001 | Ishihara et al. | 701/200 |
| 6,282,362 B1 * | 8/2001 | Murphy et al. | 386/46 |
| 6,282,490 B1 * | 8/2001 | Nimura et al. | 340/995.14 |
| 6,304,819 B1 * | 10/2001 | Agnew et al. | 701/207 |
| 6,437,797 B1 * | 8/2002 | Ota | 345/638 |
| 6,697,103 B1 * | 2/2004 | Fernandez et al. | 348/143 |
| 6,819,356 B1 * | 11/2004 | Yumoto | 348/231.2 |
| 6,859,149 B1 * | 2/2005 | Ohta et al. | 340/990 |
| 6,973,200 B1 * | 12/2005 | Tanaka et al. | 382/103 |
| 6,995,792 B1 * | 2/2006 | Ogura | 348/231.99 |
| 2001/0040627 A1 * | 11/2001 | Obradovich | 348/222 |
| 2002/0034384 A1 * | 3/2002 | Mikhail | 396/310 |
| 2003/0140136 A1 * | 7/2003 | Nakamura | 709/224 |

FOREIGN PATENT DOCUMENTS

| | | | |
|---|---|---|---|
| JP | 5-207408 A1 | | 8/1993 |
| JP | 07-288725 | * | 10/1995 |
| JP | 07288725 A | | 10/1995 |
| JP | 8-240854 A1 | | 9/1996 |
| JP | 10056609 A | | 2/1998 |
| JP | 11072348 A | | 3/1999 |
| JP | 11-282862 A1 | | 10/1999 |
| JP | 2000057320 A | | 2/2000 |
| JP | 2000-083046 | * | 3/2000 |
| JP | 2000337900 A | | 12/2000 |

OTHER PUBLICATIONS

Office Action from Japanese Application No. 2000-398534, dated Aug. 24, 2010.

Ma et al., A Framework for Adaptive Content Delivery in Heterogeneous Network Environments, XP-002168331 Dec. 1999.

* cited by examiner

```
<?xml version="1.0" encoding="Shift_JIS"?>                                      ...1
<!DOCTYPE glorie PUBLIC "-//GLORIE//GLORIE V1.0//EN" "glorie.dtd">              ...2
<glorie version="1.0">                                                          ...3

<format>                                                                      ...4
     <datum>wgs84</datum>                                                       ...5
     <time>1999-09-01T10:20:30+09:00</time>                                     ...6
  </format>                                                                    ...7

<gpoi>                                                                        ...8
     <index pos="+35.66778 +139.7686  14000000  fix tokyo"/>                    ...9
     <poi>                                                                      ...10
        <point>                                                                 ...11
           <pos>                                                                ...12
              <lat>35.667778</lat>                                              ...13
              <lon>139.7686</lon>                                               ...14
           </pos>                                                               ...15
        </point>                                                                ...16
     </poi>                                                                     ...17

<linkfile>                                                                 ...18
        <image href="file://../../DCIM/100MSDCF/DSC00015.JPG"></image>          ...19
     </linkfile>                                                                ...20

<mapset>                                                                   ...21
        <getmap format="JPEG" size="160 120"
                          href="http://www.sony.co.jp/japan/tokyo_s.jpg">       ...22
           <comment>Tokyo Small Map</comment>                                   ...23
        </getmap>                                                               ...24
     </mapset>                                                                  ...25
  </gpoi>                                                                       ...26

</glorie>                                                                       ...27
```

FIG.4

```
<?xml version="1.0" encoding="Shift_JIS"?>                                    ···1
<!DOCTYPE glorie PUBLIC "-//GLORIE//GLORIE V1.0//EN" "glorie.dtd">            ···2
<glorie version="1.0">                                                        ···3

<format>                                                                    ···4
    <datum>wgs84</datum>                                                      ···5
    <time>1999-09-01T10:20:30+09:00</time>                                    ···6
  </format>                                                                   ···7

<gpoi>                                                                      ···8
    <index pos="+35.66778 +139.7686 14000000 fix tokyo"/>                     ···9
    <poi>                                                                     ···10
      <point>                                                                 ···11
        <pos>                                                                 ···12
          <lat>35.667778</lat>                                                ···13
          <lon>139.7686</lon>                                                 ···14
        </pos>                                                                ···15
      </point>                                                                ···16
    </poi>                                                                    ···17

<linkfile>                                                                ···18
      <image href="file://../../DCIM/100MSDCF/DSC00015.JPG"></image>          ···19
    </linkfile>                                                               ···20

<mapset>                                                                  ···21
      <getmap format="JPEG" size="640 480"
                      href="http://www.sony.co.jp/japan/tokyo_1.jpg">         ···22
        <upper-right>                                                         ···23
          <lat>36.00</lat>                                                    ···24
          <lon>140.00</lon>                                                   ···25
        </upper-right>                                                        ···26
        <lower-left>                                                          ···27
          <lat>35.00</lat>                                                    ···28
          <lon>139.00</lon>                                                   ···29
        </lower-left>                                                         ···30
        <comment>Tokyo Big Map</comment>                                      ···31
      </getmap>                                                               ···32
    </mapset>                                                                 ···33
  </gpoi>                                                                     ···34

</glorie>                                                                     ···35
```

FIG.5

```
<?xml version="1.0" encoding="Shift_JIS"?>                                      ...1
<!DOCTYPE glorie PUBLIC "-//GLORIE//GLORIE V1.0//EN" "glorie.dtd">              ...2
<glorie version="1.0">                                                          ...3

<format>                                                                      ...4
    <datum>wgs84</datum>                                                        ...5
    <time>1999-09-01T10:20:30+09:00</time>                                      ...6
  </format>                                                                     ...7

<gpoi>                                                                        ...8
    <index pos="+35.66778 +139.7686 14000000 fix tokyo"/>                       ...9
    <poi>                                                                       ...10
      <point>                                                                   ...11
        <pos>                                                                   ...12
          <lat>35.667778</lat>                                                  ...13
          <lon>139.7686</lon>                                                   ...14
        </pos>                                                                  ...15
      </point>                                                                  ...16
    </poi>                                                                      ...17

<linkfile>                                                                  ...18
      <image href="file://../../DCIM/100MSDCF/DSC00015.JPG"></image>            ...19
    </linkfile>                                                                 ...20

<mapset>                                                                    ...21
      <getmap format="JPEG" size="640 480"
                            href="http://www.sony.co.jp/japan/tokyo_s.jpg">    ...22
        <comment>Tokyo JPEG Map</comment>                                       ...23
      </getmap>                                                                 ...24
      <getmap format="PNG" size="320 240"                                       ...25
                            href="http://www.sony.co.jp/japan/tokyo.png">      ...26
        <comment>Tokyo PNG Map</comment>
      </getmap>                                                                 ...27
    </mapset>                                                                   ...28
  </gpoi>                                                                       ...29

</glorie>                                                                       ...30
```

APPARATUS AND METHOD FOR PROCESSING MAP DATA AND STORAGE MEDIUM HAVING INFORMATION FOR CONTROLLING THE PROCESSING OF MAP DATA

TECHNICAL FIELD

The present invention relates to an information processing apparatus capable of processing any data including positional information by linking it with map information when processing such data even if an apparatus not having map information inside it, a method of the same, a machine readable storage medium storing control information of an information processing apparatus, and an image processing apparatus capable of using image data given positional information linked with map information.

BACKGROUND ART

Due to the increasing small size and higher performance of information equipment and advances in electronic information technology such as digitization of information, a variety of signal processing apparatuses, data recording/reproducing apparatuses, communication apparatuses, information processing apparatuses, etc. have spread in use. These apparatuses have come to make frequent use of positional information in recent years.

For example, by storing positional information of facilities and locations originating certain data, positional information of locations acquiring certain data, etc. linked with the data, there are the effects that when later using the data, it becomes easier to use the data, it becomes possible to use the data in a new form, etc. Thus, data has come to be used in a variety of venues.

More specifically, it is being used for clearly indicating locations of post offices or restaurants along with information thereof, for indicating shooting locations for photos and other image data, etc.

This positional information is numerical data such as latitude and longitude and in itself is hard for people to directly understand, grasp, and use.

Therefore, in many cases the data is used by the method of using some sort of pointer or mark on map information to indicate the position.

For this, each apparatus has to hold the map information in advance.

However, there was the problem that this map information was generally a large amount of data and it was difficult for all apparatuses to hold the information. Particularly, it has been substantially difficult to store and hold such a large amount of map information in mobile terminals, camcorders, and other small sized equipment. As a result, there is the problem that positional information cannot be used in the most suitable form in apparatuses not holding map information.

DISCLOSURE OF THE INVENTION

An object of the present invention is to provide an information processing apparatus and an information processing method enabling effective utilization of any data including positional information by linking the positional information with map information even if not having map information internally.

Another object of the present invention is to provide a machine readable storage medium storing control information of an information processing apparatus enabling effective utilization of any data including positional information by linking the positional information with map information even in an information processing apparatus not having map information internally.

Still another object of the present invention is to provide an image processing apparatus enabling effective utilization of image data linked with positional information by linking it with map information even if not having map information internally.

An information processing apparatus according to the present invention comprises a map data acquiring means for acquiring map data for data of a predetermined format including desired data, positional data relating to that data, and map data reference information relating to that positional information based on the map data reference information and an information processing means for performing predetermined information processing based on the acquired map data, the positional data, and the desired data.

Preferably, the apparatus further has a position specifying means for specifying a position indicated by the positional data on the acquired map data, and the information processing means performs predetermined processing on the desired data by linking the desired data with the map data specified in position indicated by the positional data.

Specifically, the information processing means displays the map data specified in position indicated by the positional data and the desired data so that linkage of the desired data and the position specified on the map data becomes clear.

Preferably, the map data reference information includes link information to map data of a map including the position indicated by the positional data in its range, a format of the map data, and a size of the map data.

Preferably, the map data acquiring means acquires the map data from any node via a network based on the link information.

More preferably, the map data has information indicating an absolute position of the map; and the position specifying means specifies a position indicated by the positional data on the map data based on information indicating the absolute position included in the map data.

More preferably, the map data reference information has information indicating an absolute position of map data indicated by the link information; and the position specifying means specifies a position indicated by the positional data on the map data based on information indicating the absolute position included in the map data reference information.

More specifically, the data of a predetermined format includes a plurality of the map data reference information for one desired data and positional data, the apparatus further comprises a map data reference information selecting means for selecting one map data reference information from the plurality of map data reference information; and the map data acquiring means acquires one map data based on the selected map data reference information.

More specifically, the data of a predetermined format includes a plurality of the map data reference information for one desired data and positional data; the map data acquiring means acquires any plurality of map data in map data indicated by the plurality of map data reference information; and the position specifying means and the information processing means specify a position indicated by the positional data or perform predetermined processing for the desired data for any one or more map data in the acquired plurality of map data in accordance with need.

Further, an information processing method according to the present invention comprises acquiring map data for data of a predetermined format including desired data, positional data relating to the data, and map data reference information relating to the position information based on the map data reference information and performing predetermined information processing based on the acquired map data, the positional data, and the desired data.

Further, a machine readable storage medium storing control information of an information processing apparatus according to the present invention stores control information of an information processing apparatus including positional data relating to desired data and map data reference information relating to the position information and, by being read by the information processing apparatus, allowing map data based on the map data reference information to be acquired, a position indicated by the positional data to be specified in the acquired map data, and predetermined processing to be performed on the desired data by linking the desired data with the map data specified in position indicated by the positional data.

Further, an image processing apparatus according to the present invention comprises a map data acquiring means for acquiring map data for data of a predetermined format including desired data, positional data relating to image data, and map data reference information relating to the position information based on the map data reference information; a position specifying means for specifying a position indicated by the positional data in the acquired map data; and a display means for displaying the map data specified in position indicated by the positional data and the image data so that linkage of the image data and the position specified on the map data becomes clear.

Preferably, the map data acquiring means comprises a communication means capable of communicating with any node on a communication network and acquires the map data from any node via a network based on the map data reference information.

More preferably, the apparatus further comprises an image pickup means for picking up a desired image and generating image data, a positional data generating means for generating positional data indicating a position of a location where the image was picked up, a map data reference information generating means for generating map data reference information indicating predetermined map data set in advance, the map data reference information indicating map data including the position where the image was picked up indicated by the positional data in its range, and a storage means for storing the generated image data, the generated positional data, and the generated map data in a predetermined format.

BEST MODE FOR CARRYING OUT THE INVENTION

An embodiment of the present invention will be explained with reference to FIG. 1 to FIG. 7.

In the present embodiment, the present invention will be explained by taking as an example a video camcorder system capable of picking up and storing a desired video and image and displaying already stored video and images on a liquid crystal screen, particularly a video camcorder system capable of displaying image data, stored linked with positional information, linked with map information.

First, the configuration of the video camcorder system will be explained with reference to FIG. 1.

Figure 1:
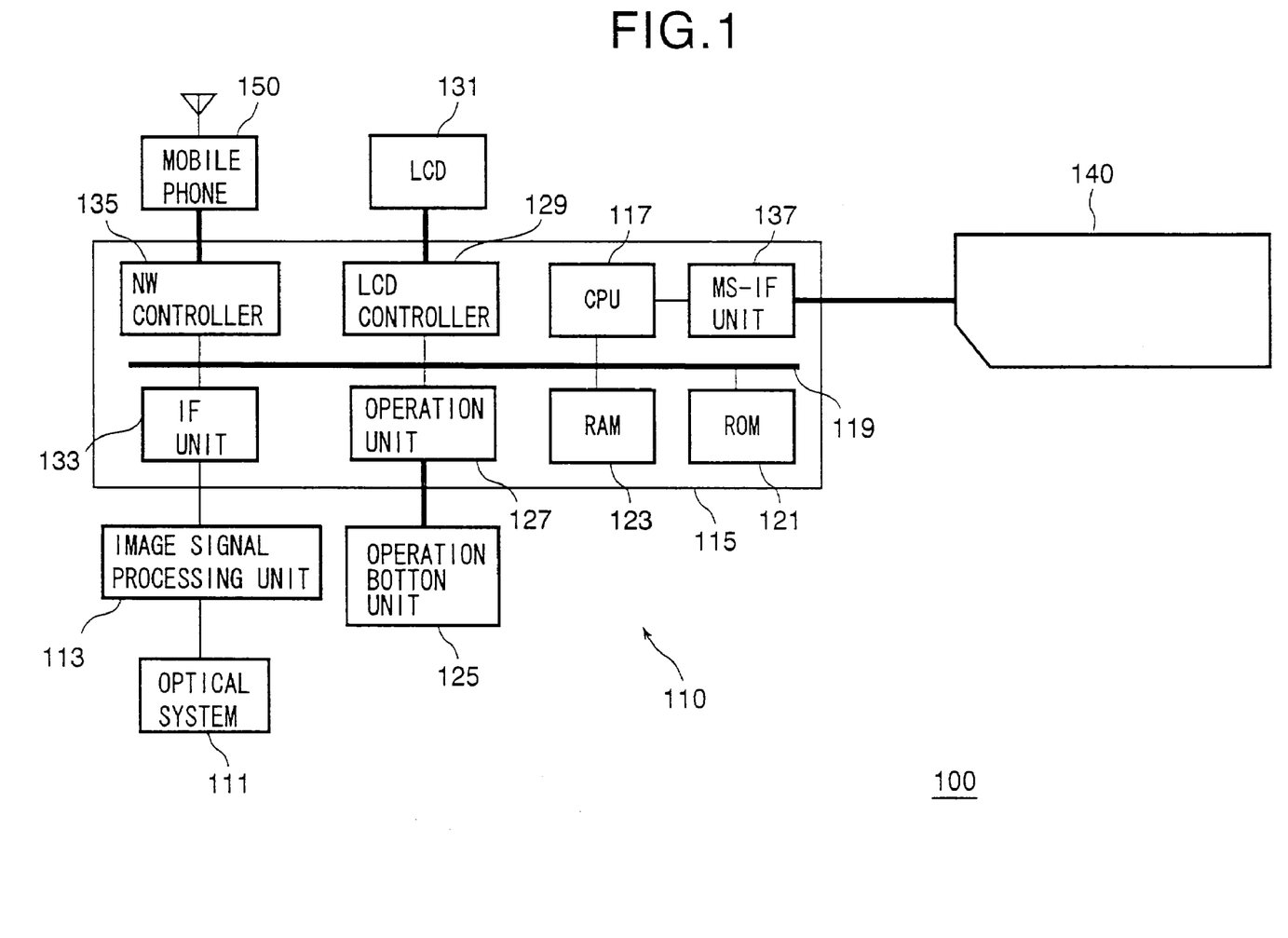
FIG. 1 is a block diagram of the configuration of a video camcorder system of an embodiment of the present invention.

FIG. 1 is a block diagram of the configuration of a video camcorder system 100.

The video camcorder system 100 has a video camcorder 110, a memory stick 140, and a mobile phone 150.

The video camcorder 110 has an optical system 111, an image signal processing unit 113, a control circuit 115, an operation button unit 125, and an LCD 131. Further, the control circuit 115 has a CPU 117, a bus 119, a ROM 121, a RAM 123, an operation unit 127, an LCD controller 129, an IF unit 133, a network controller 135, and an MS-IF unit 137.

Below, the configurations of the components will be explained.

The optical system 111 picks up a desired video or image and outputs a corresponding signal. The optical system 111 has an optical system for forming an image of a desired image on the surface of a pickup element, a drive unit for driving the optical system, a pickup element for generating an electric signal corresponding to the formed image, etc.

The image signal processing unit 113 performs predetermined signal processing on the signal output from the optical system 111 to convert it to an image signal of a predetermined format and outputs it to the control circuit 115. Specifically, the image signal processing unit 113 processes the input image signal for analog/digital conversion, white balance, gamma correction, etc. and encodes the result to a predetermined format to generates an image signal of a predetermined format.

The control circuit 115 comprises the main signal circuits of the video camcorder 110 on a semiconductor integrated circuit and controls portions of the video camcorder 110 so that processing such as picking up a desired image, storing the taken image, reproducing and displaying the stored image, acquiring relating map information, and displaying the acquired map information is suitably performed in the video camcorder 110.

As explained above, the control circuit 115 has a CPU 117, bus 119, ROM 121, RAM 123, operation unit 127, LCD controller 129, IF unit 133, network controller 135, and MS-IF unit 137.

The CPU 117 further controls the components of the control circuit 115 so that the control circuit 155 realizes the above functions.

Specifically, first the CPU 117 controls the IF unit 133, bus 119, MS-IF unit 137, etc. to store a picked up image and video by reading a picked up image and video signal from the image signal processing unit 113 via the IF unit 133 and storing the same in the memory stick 140 or a not shown other storage medium via the MS-IF unit 137.

Further, the CPU 117 controls the MS-IF unit 137, bus 119, LCD controller 129, etc. to reproduce and display the stored image by reading a positional information file and an image signal from the memory stick 140 or not shown other storage medium via the MS-IF unit 137 and displaying it on the LCD 131 via the LCD controller 129.

Further, the CPU 117 controls the MS-IF unit 137, bus 119, network controller 135, LCD controller 129, etc. to display the positional information file of the stored image data on a map by reading the positional information file from the memory stick 140 or the not shown storage medium via the MS-IF unit 137, suitably detecting a reference of map information stored in the positional information file, acquiring the map information via the mobile phone 150, and displaying the acquired information on the LCD 131.

Further, the CPU 117 controls the operation unit 127, bus 119, MS-IF unit 137, etc. to reproduce and display the stored image based on the map information by detecting operation of the operation button unit 125 by the user via the operation unit 127 and reading the desired image signal based thereon from the memory stick 140 or the not shown storage medium via the MS-IF unit 137.

Further, the CPU 117 controls the processing for generating a positional information file at the time of storing a picked up image or video in accordance with need. In this case, the CPU 117 first detects a position of the video camcorder 110 based on GPS received information received at a not shown GPS receiver provided in the video camcorder 110 in accordance with need. Then, the CPU 117 uses the positional information and information indicating a location of map information to be referred to set in advance to generate a positional information file and stores the same along with the picked up image data in the memory stick 140 via the MS-IF unit 137.

The CPU 117 for example performs control relating to such processing.

Note that the content and format of the positional information file will be explained in detail later.

The bus 119 is a system bus in the video camcorder 110 for connecting the CPU 117 and components.

The ROM 121 is a memory for storing a processing program for executing above explained processing, parameters referred to by the components at that time, etc.

The RAM 123 is a memory for storing data generated by the CPU 117 and components, data being processed, etc. at the time of executing such processing in the same way.

The operation button unit 125 is an operation means operated by a user of the video camcorder 110. Instructions to pick up and reproduce an image, to select image data from map information, etc. are given via the operation button unit 125.

The operation unit 127 detects an operation of the operation button unit 125 by a user, generates a signal based on the content of the operation, and outputs the same to predetermined components such as the CPU 117 or LCD controller based on the content of the operation.

The LCD controller 129 is a controller for displaying on the LCD 131 image data or map information input via the bus 119.

The LCD 131 is a liquid crystal display controlled by the LCD controller 129 and displaying input desired image data.

The MS-IF unit 137 is an interface controlled by the CPU 117 and communicating with the memory stick 140. Storage of image data and a positional information file to the memory stick 140 or reading of the image data and a positional information file from the memory stick 140 are performed via the MS-IF unit 137.

Specifically, the MS-IF unit 137 communicates with the memory stick 140 via three signal lines of a first signal line (SCLK) for sending a clock, a second signal line (SDIO) for transferring data, and a third signal line (SS) for sending a status.

The memory stick 140 is a detachable card type storage medium loaded in the video camcorder 110. In the video camcorder 110 of the present embodiment, it particularly stores a positional information file including information indicating a position of image data and reference information of map information and is accessed in accordance with need.

Figure 2:
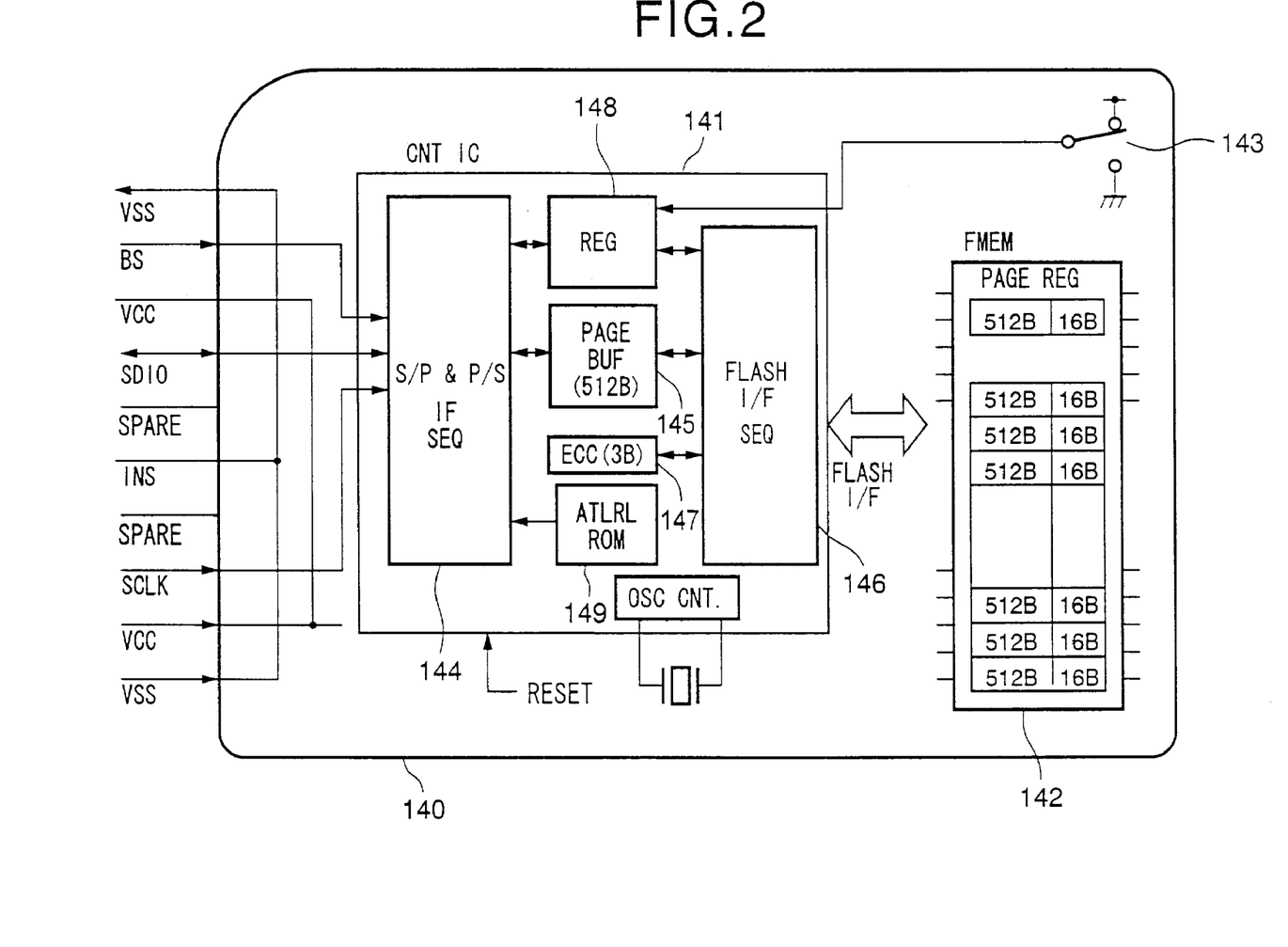
FIG. 2 is a block diagram of a detailed configuration of a memory stick of the video camcorder system shown in FIG. 1.

The configuration of the memory stick 140 will be explained in detail with reference to FIG. 2.

The memory stick 140 has a control IC 141, flash memory 142, and write protect switch 143. The control IC 141 has a serial/parallel parallel/serial (S/P•P/S) interface sequencer 144, page buffer 145, flash interface sequencer 146, ECC encoder/decoder 147, register 148, and attribute ROM 149.

The S/P•P/S interface sequencer 144 of the control IC 141 communicates with the MS-IF unit 124 of a navigation apparatus 110, receives a clock signal SCLK and a status signal SS, and transfers data SDIO.

More specifically, it receives data SDIO sent from the navigation apparatus 110 and converts it to parallel data in synchronization with a serial clock SCLK, then outputs the converted data to the register 148 when a command while outputs it to the page buffer 145 when data.

Further, it converts data sent to the navigation apparatus 110 input from the page buffer 145 etc. to serial data and sends it to the navigation apparatus 110 via a data line SDIO.

The page buffer 145 of the control IC 141 is a memory for storing data input from the control IC 141 in page units (512 bytes). Data stored in the page buffer 145 is, after being given an error correction code by the ECC encoder/decoder 147, stored in the flash memory 142 via the flash interface sequencer 146.

Further, the page buffer 145 stores data read from the flash memory 142 via the flash interface sequencer 146. Then, after corrected for error in the ECC encoder/decoder 147, the data is suitably output to the S/P•P/S interface sequencer 144.

The flash interface sequencer 146 stores data in page units stored in the page buffer 145 in the flash memory 142 in accordance with need or reads data stored in the flash memory 142 in page units and stores it in the page buffer 145.

The ECC encoder/decoder 147 adds an error correction code to data stored in the page buffer 145 to be stored in the flash memory 142. Further, it corrects error for data stored in the page buffer 145 and read from the flash memory 142.

The register 148 generates a control command based on command data input from the S/P•P/S interface sequencer 144. For example, when the register 148 receives a read status register command for checking an operating state of the memory stick 140, it detects content set in the write protect switch 143 and sets the set content to the register. Then, it sends the content of the register to the navigation apparatus 110 via the S/P•P/S interface sequencer 144.

The attribute ROM 149 is a memory storing version information, initial settings, and other information of the memory stick 140. The information of the initial settings stored in the attribute ROM 149 is read based on a control command generated in the register 148 the first time that the memory stick 140 is loaded in the navigation apparatus 110 and is used for setting the parts in the memory stick 140.

The flash memory 142 is a storage unit for actually storing a positional information file and additional information.

The write protect switch 143 is a switch for limiting writing of data to the flash memory 142 so as not to delete data stored in the memory stick 140.

The mobile phone 150 is an ordinary mobile phone, but is used as a communication apparatus for communicating with any communication node in the video camcorder system 100. The mobile phone 150 performs desired communication in accordance with a request from the CPU 117 by being connected to the control circuit 115 of the video camcorder 110 via the network controller 135. As processing according to the present invention, this is used to access the Internet to acquire map information from a desired node.

Next, a positional information file stored in the memory stick 140 will be explained with reference to FIG. 3 to FIG. 5.

First, the basic configuration of the positional information file will be explained with reference to FIG. 3.

Figure 3:
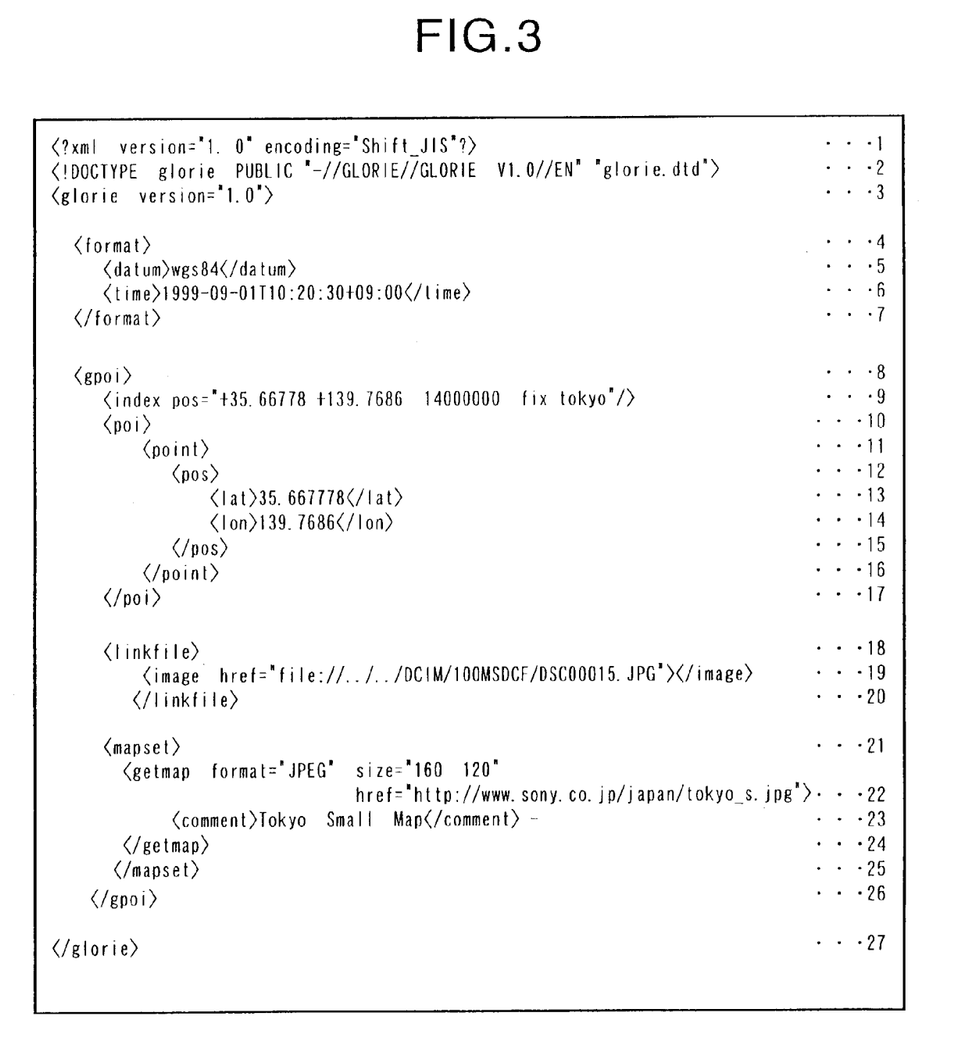
FIG. 3 is a view of a first specific example of a positional information file.

FIG. 3 is a view of a first specific example of the positional information file.

In the positional information file shown in FIG. 3, lines 1 to 3 are a description for clarifying and setting a descriptive format of the positional information file. In the positional information file shown in FIG. 3, it is set here that the file is in a format using XML (eXtensible Markup Language).

The "format" tag in lines 4 to 7 describes the used positioning system, coordinate system, information creator, information creation date and time, etc.

The "gpoi" tag in lines 8 to 17 is a description defining the specific position. In the present embodiment, it is used for indicating a position where image data corresponding to the positional information file was picked up.

The "index" tag in line 9 is a search tag describing positional information having a latitude and longitude, information indicating the type of the position, information indicating whether the position is a moving object, the positioning system, etc.

Further, the position is actually defined in the "poi" tag in lines 11 to 17. Here, the latitude is specified by the "lat" tag in line 13, while the longitude is specified by the "lon" tag in line 14.

The "linkfile" tag in lines 18 to 20 describes information for specifying data relating to the position, that is, information for specifying image data corresponding to the positional information file.

The "mapset" tag in lines 21 to 25 is a tag for specifying the reference when an apparatus does not include map information and refers to external map data.

The "mapset" tag describes a "getmap" tag indicating a link to one or more map information and a "comment" tag for writing a comment described in accordance with need.

The "getmap" tag is written in a format as shown in (1).

$$\text{<getmap format="file format" size="image size" href="hyper reference"></getmap>} \quad (1)$$

As shown in the format (1), the "getmap" tag describes the three attributes of "format", "size", and "href".

The attribute "format" is for clearly indicating the format of map data to be linked by URI and can designate the JPEG, GIF, PNG, BMP, SVG and other formats.

The attribute "size" describes the image size of the map data by a decimal number like [Size="xxxx yyyy"] (xxxx: number of horizontal pixels, yyyy: number of vertical pixels).

The attribute "href" indicates the URL of the map data to be linked. Particularly, the map data to be linked has to be a map in a range which can be pointed to in position by the "poi" tag.

In the description of lines 21 to 25 of the positional information file in FIG. 3, the "format" attribute is "JPEG" and "160 120" is designated as the "size" attribute. Accordingly, it is learned that a 160 pixel X 120 pixel JPEG format file is specified. Further, the "href" attribute specifies the file on a network.

Next, the configuration of the positional information file describing the linkage of the map information and actual position in a "getmap" tag will be explained with reference to FIG. 4.

Figure 4:
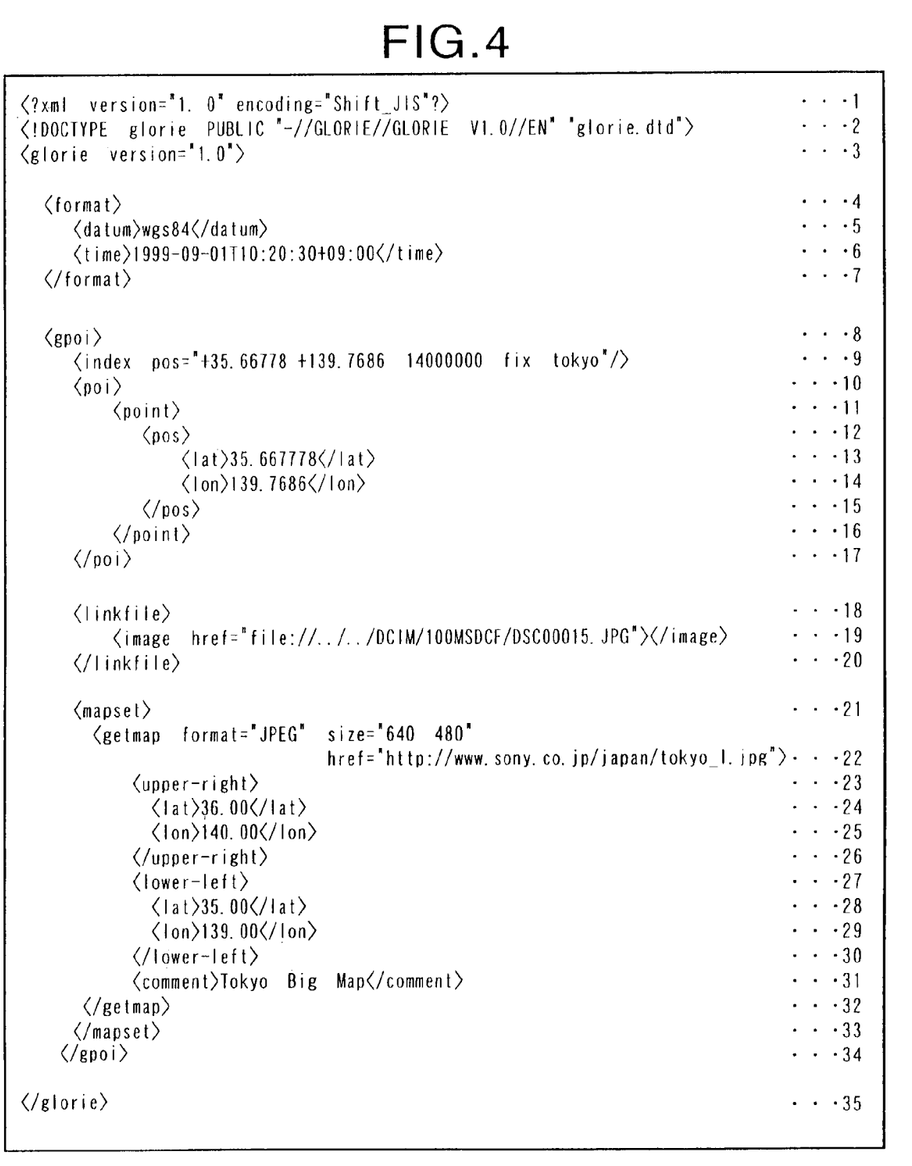
FIG. 4 is a view of a second specific example of a positional information file.

FIG. 4 is a view of a second specific example of a positional information file. This is a file of a format describing an "upper-right" tag and a "lower-left" tag after the "getmap" tag on a line 22 of the positional information file shown in FIG. 3.

The "upper-right" tag is a description of information indicating the position of the upper right portion of the map information, while the "lower-left" tag is a description of information indicating the position at the lower left portion of the map information. The "lat" tag and "lon" tag describe the latitude and longitude, respectively.

By using such a description method, that is, by describing the "upper-right" tag and the "lower-left" tag in a positional information file, the map information no longer has to include information for specifying the position. As map information capable of specifying a certain position, what position a region described as a map indicates needs to be indicated for example by the latitude and longitude. This is normally described in the header of the map information. By using such a descriptive method, however, such information becomes unnecessary. As a result, general map information can be used as the map information of the reference.

As the positional information file, a file of the above format can be used.

Next, a positional information file having a plurality of "getmap" tags will be explained with reference to FIG. 5.

Figure 5:
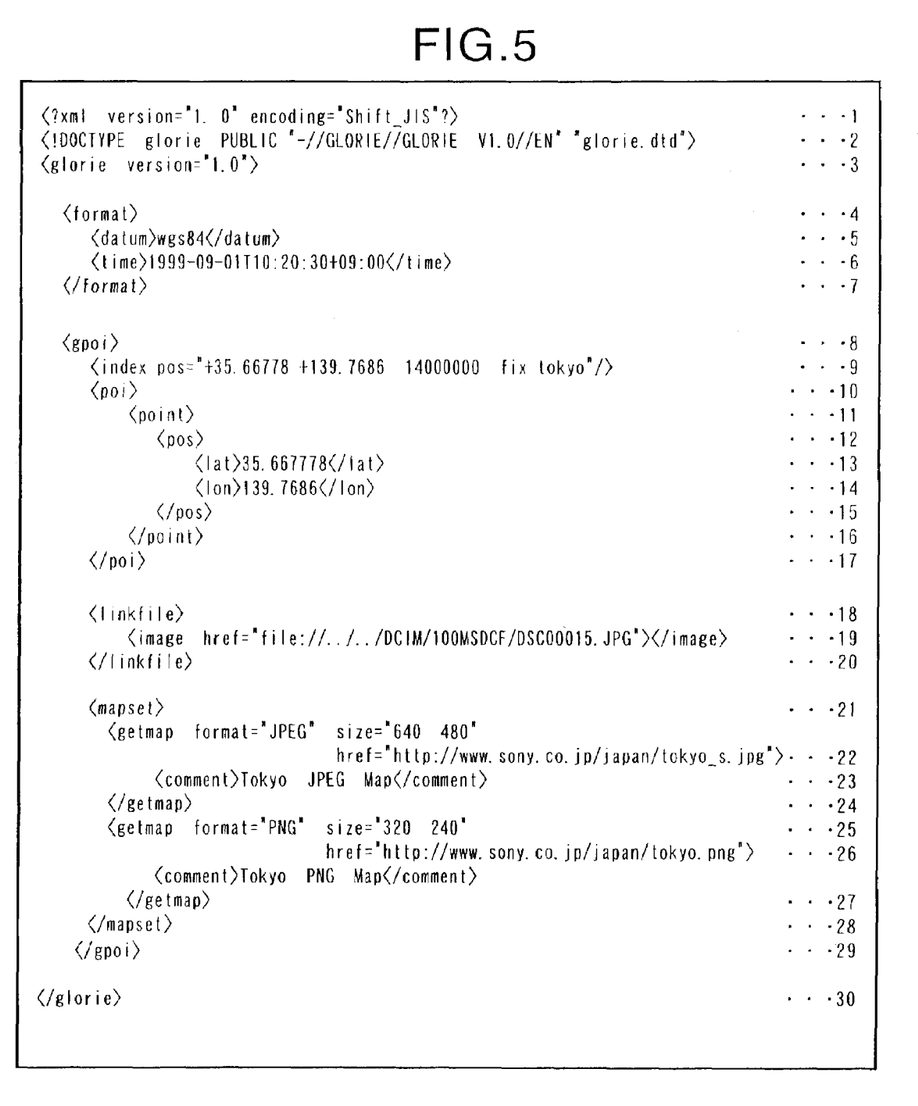
FIG. 5 is a view of a third specific example of a positional information file.

FIG. 5 is a view of a third specific example of a positional information file, wherein "getmap" tags are described in lines 22 to 24 and lines 25 to 27 from the "mapset" tag of line 21 on. More specifically, a link to map information of the JPEG format is described in lines 22 to 24 and a link to map information in the PNG format is described in lines 25 to 27.

The positional information file, as explained above, can describe two or more "getmap" tags.

In this case, on the apparatus side such as on a video camcorder 100 side using the above, it is sufficient to select and use a map of a format or size in accordance with the apparatus, objective, etc.

Also, depending on the case, after acquiring a plurality of map information, it is possible to perform processing prompting a user to make a selection etc.

By using such a description method, it becomes possible to describe a positional information file supporting a plurality of apparatuses.

As a positional information file, a file of such a format can be used.

Next, the operation of the video camcorder system 100 will be explained with reference to FIG. 6, FIG. 7A, and FIG. 7B.

Note that, here, the operation of the video camcorder system 100 according to the present invention of first displaying map information for image data stored along with the positional information file and displaying image data superimposed on the map information by selection from the screen will be explained.

Figure 6:
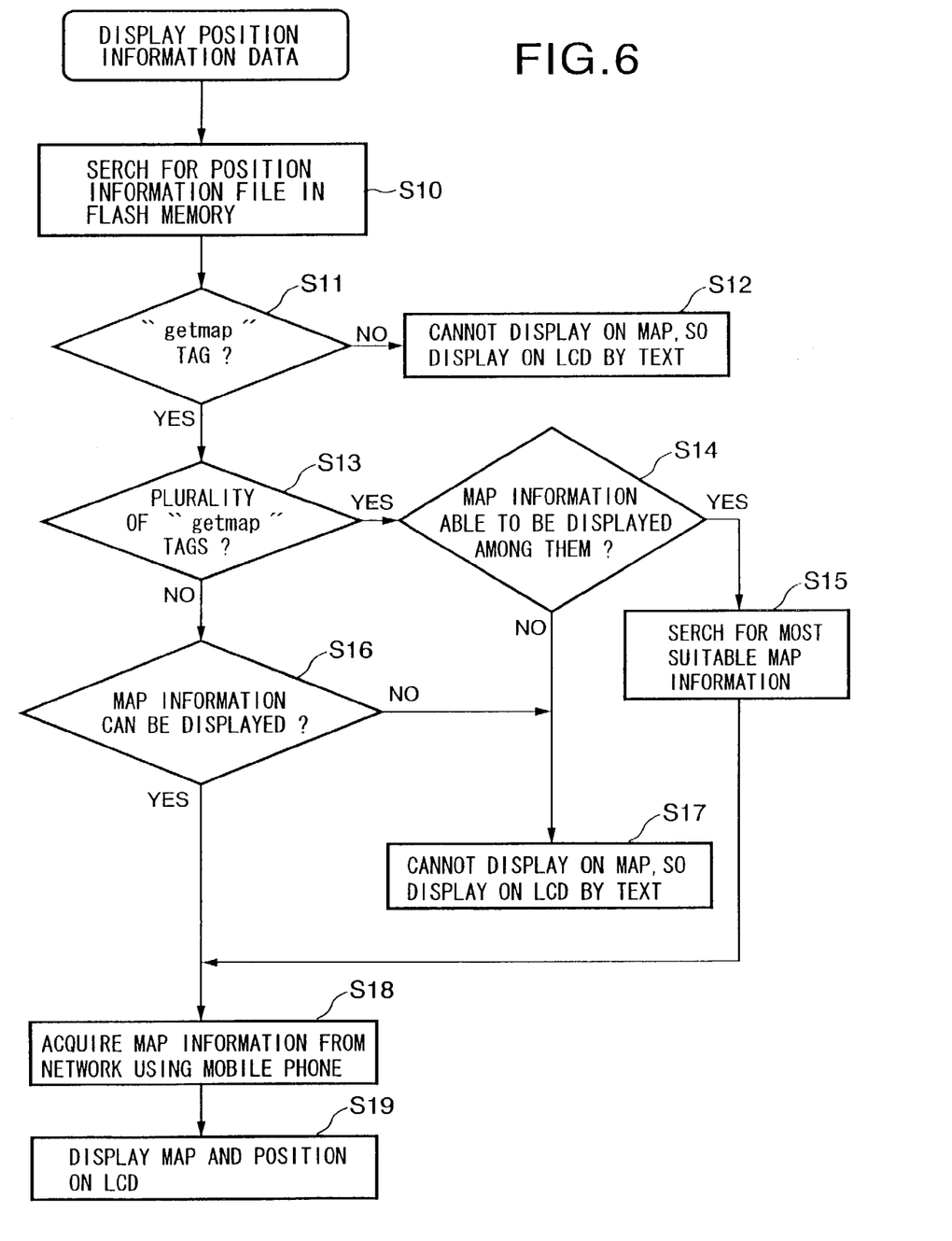
FIG. 6 is a flow chart for explaining an operation for displaying map information based on the positional information file in the video camcorder system shown in FIG. 1.

FIG. 6 is a flow chart for explaining such an operation of the video camcorder system 100.

First, when a user tries to operate the apparatus as explained above, the CPU 117 searches for a positional information file to be displayed from the flash memory 142 of the memory stick 140 via the MS-IF unit 137 based on a predetermined operation by the user (step S10).

Next, it searches for a "getmap" tag from the file (step S11). When there is no "getmap" tag, it cannot display a map and cannot display the position on a map, so for example performs processing for displaying the positional information by text on the LCD 131 (step S12).

When there is a "getmap" tag, it checks whether there are a plurality of "getmap" tags (step S13). When there are a plurality, it checks whether there is map information able to be displayed in it based on content of the "getmap" tags (step S14). When there is map information able to be displayed, it further searches for the most suitable map information in it (step S15). When there is no "getmap" tag which defines map information able to be displayed in the plurality of "getmap" tags (step S14), it cannot display a map and cannot display the position on a map, so for example it performs processing for displaying the positional information by text on the LCD 131 (step S17).

Also, when there is only one "getmap" tag in the positional information file (step S13), it checks whether the map information is able to be displayed based on the content of the "getmap" tag (step S16). When the map information cannot be displayed, it cannot display a map either so for example performs processing for displaying the positional information by text on the LCD 131 (step S17)

When suitable map information able to be displayed is detected in the plurality of "getmap" tags at step S15 or when one "getmap" tag is map information able to be displayed at step S16, the CPU 117 acquires map information from a link described in the "getmap" tag via the mobile phone 150 (step S18).

Then, it displays the map information on the LCD 131 and makes some mark at the location specified by the positional information file to clearly indicate the position.

Figures 7A, 7B:
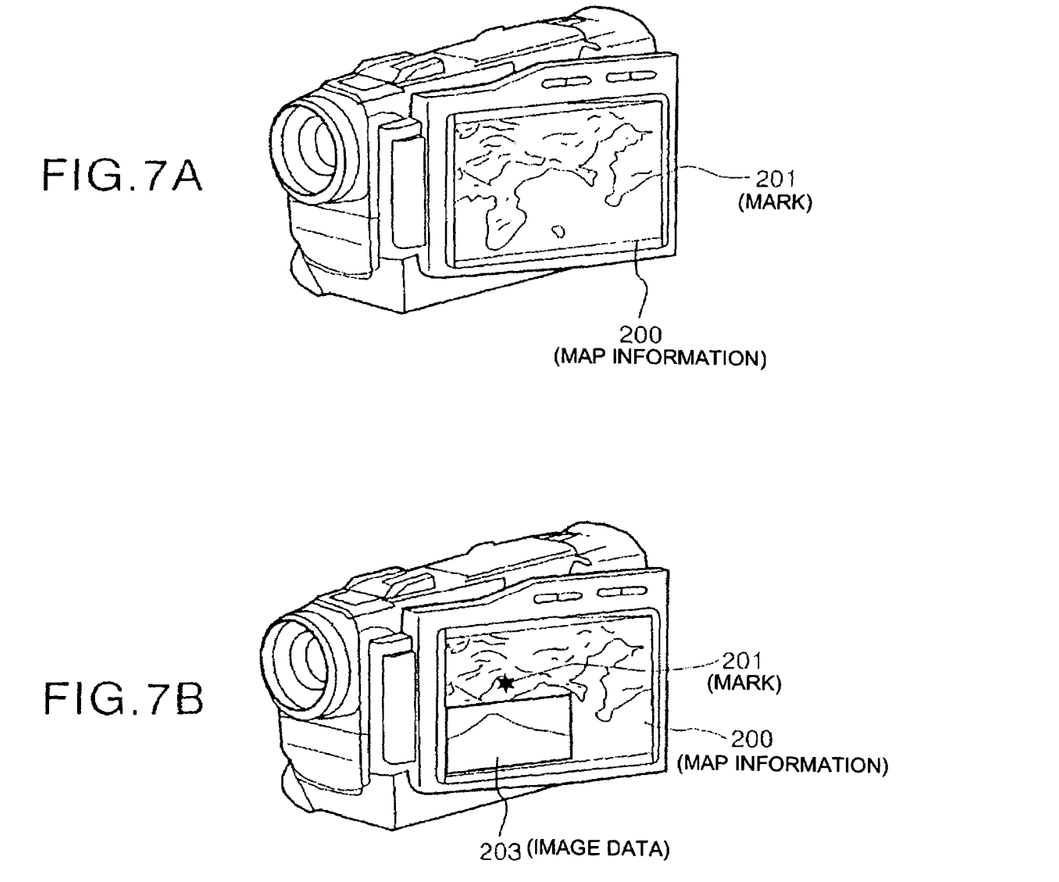
FIGS. 7A and 7B are views of a state of displaying map information and a state where image data is read based on the displayed map information in the video camcorder system shown in FIG. 1.

By performing such processing, even a video camcorder system 100 not having map information therein can, for example as shown in FIG. 7A, display map information 200 on the LCD 131. Further, it can display the positional information of specific data on the map information 200 for example in the form of a mark 201.

Note that in the video camcorder system 100 performing such processing, for example by the user selecting the mark 201, the CPU 117 can read data linked with the positional information, that is, image data, from the memory stick 140 and display it on the LCD 131.

For example, when superimposed on the map information 200, the image data 203 is displayed as shown in FIG. 7B.

Note that the present invention is not limited to the present embodiment. Any various preferable modifications can be made.

For example, the above embodiment uses a mobile phone 150 as a communication means for connecting a network and the video camcorder system 100. However, the communication means is not limited to the mobile phone 150. Any communication apparatus can be used.

Further, the above embodiment illustrated as an example a system using a video camcorder, but the present invention is not limited to this. It can be applied to any apparatus not having map information therein.

Further, the above embodiment stores the positional information file and image data in the memory stick 140, but this does not has to be a memory stick. Any portable type of storage medium will do. It is also possible to store the file and data in a not shown storage unit in the video camcorder system 100.

In this way, according to the present invention, it is possible to provide an information processing apparatus and an information processing method enabling effective utilization of any data including positional information by linking the positional information with map information even if not having map information internally.

Further, it is possible to provide a machine readable storage medium storing control information of an information processing apparatus enabling effective utilization of any data including positional information by linking the positional information with map information even in an information processing apparatus not having map information internally.

Still further, it is possible to provide an image processing apparatus enabling effective utilization of image data linked with positional information by linking it with map information even if not having map information internally.

INDUSTRIAL APPLICABILITY

The present invention can be used in a variety of industrial fields utilizing map information.

| LIST OF REFERENCES | |
|---|---|
| 100 | video camcorder system |
| 110 | video camcorder |
| 111 | optical system |
| 113 | image signal processing unit |
| 115 | control circuit |
| 117 | CPU |
| 119 | bus |
| 121 | ROM |
| 123 | RAM |
| 125 | operation button unit |
| 127 | operation unit |
| 129 | LCD controller |
| 131 | LCD |
| 133 | IF unit |
| 135 | network controller |
| 137 | MS-IF unit |
| 140 | memory stick |
| 141 | control IC |
| 142 | flash memory |
| 143 | write protect switch |
| 144 | S/P P/S interface sequencer |
| 145 | page buffer |
| 146 | flash interface sequencer |
| 147 | ECC encoder/decoder |
| 148 | register |
| 149 | attribute ROM |
| 150 | mobile phone |
| 200 | map information |
| 201 | mark |
| 203 | image data |

The invention claimed is:

1. A mobile digital image acquisition apparatus comprises:
position data determining means for determining positional data for said apparatus;
imaging means for picking up a desired image;
a map data acquiring means for downloading map data from a network and storing the map data corresponding to the positional data of the apparatus; the map data including a graphic image of a map of a predetermined graphic format and corresponding to the positional data;
removable storage means for storing a positional information file linking said desired image to the positional information and to the corresponding map data;
an information processing means for performing predetermined information processing based on the map data, said positional data, and the desired image linked in the positional information file so as to form an output signal; and
display means for receiving the output signal and for enabling an image corresponding to the desired image and an image corresponding to the map data to be simultaneously displayed thereon,
wherein the positional information file includes text tag delimiters for delimiting a download reference for retrieving the graphic image of the map from a source external to the mobile digital image acquisition, text tag delimiters for delimiting the positional information corresponding to the geographic location of the apparatus when the desired image was picked up with the imaging means, text tag delimiters for delimiting an image filename of the desired image, text tag delimiters for delimiting positional information corresponding to geographic location of a first corner of the graphic image of the map and text tag delimiters for delimiting positional information corresponding to geographic location of a second corner of the graphic image of the map.

2. The mobile digital image acquisition apparatus as set forth in claim 1, wherein the apparatus further comprises a position specifying means for specifying a position indicated by said positional data on said acquired map data, and said information processing means performs predetermined processing on said desired image by linking said desired image with said map data specified in the position indicated by said positional data.

3. The mobile digital image acquisition apparatus as set forth in claim 2, wherein map data reference information of the positional information file includes link information to map data of a map including said position indicated by said positional data in its range, a format of the map data, and a size of the map data.

4. The mobile digital image acquisition apparatus as set forth in claim 3, wherein said map data acquiring means acquires said map data from any node via the network based on said link information.

5. The mobile digital image acquisition apparatus as set forth in claim 3, wherein said map data has information indicating an absolute position of the map; and said position specifying means specifies a position indicated by said positional data on the map data based on information indicating said absolute position included in said map data.

6. The mobile digital image acquisition apparatus as set forth in claim 3, wherein said map data reference information includes information indicating an absolute position of map data indicated by said link information; and said position specifying means specifies a position indicated by said positional data on the map data based on information indicating said absolute position included in said map data reference information.

7. The mobile digital image acquisition apparatus as set forth in claim 3, wherein said data of a predetermined format includes a plurality of said map data reference information for one desired image and positional data;

the apparatus further comprises a map data reference information selecting means for selecting one map data reference information from said plurality of map data reference information; and said map data acquiring means acquires one map data based on said selected map data reference information.

8. The mobile digital image acquisition apparatus as set forth in claim 4, wherein said data of a predetermined format includes a plurality of said map data reference information for one desired image and positional data;

said map data acquiring means acquires any plurality of map data in map data indicated by said plurality of map data reference information; and said position specifying means and said information processing means specify a position indicated by said positional data or perform predetermined processing for said desired image for any one or more map data in said acquired plurality of map data in accordance with need.

9. The method of claim 1 wherein the text tag delimiters for delimiting positional information corresponding to geographic location of the first and second corner of the graphic image of the map further delimit text tag delimiters for separately delimiting longitude and latitude coordinates.

10. An mobile digital image acquisition method comprising the steps of:

determining positional data of a mobile digital image acquisition apparatus;

picking up a desired image;

downloading graphic image map data from network and storing the map data corresponding to the positional data of the apparatus; the graphic image map data being a map of a predetermined format and corresponding to the positional data;

storing a positional information file linking said desired image to the positional information and to the corresponding map data in a removable storage device in the apparatus;

performing predetermined information processing based on the map data, said positional data, and the desired image linked in the positional information file so as to form an output signal; and receiving the output signal and for enabling an image corresponding to the desired image and an image corresponding to the map data to be simultaneously displayed, wherein the positional information file includes text tag delimiters for delimiting a download reference for retrieving the graphic image of the map from a source external to the mobile digital image acquisition apparatus, text tag delimiters for delimiting the positional information corresponding to the geographic location of the apparatus when the desired image was picked up, text tag delimiters for delimiting an image filename of the desired image, text tag delimiters for delimiting positional information corresponding to geographic location of a first corner of the graphic image of the map and text tag delimiters for delimiting positional information corresponding to geographic location of a second corner of the graphic image of the map.

11. The mobile digital image acquisition method as set forth in claim 9, further comprising:

specifying a position indicated by said positional data on said acquired map data; and performing predetermined processing on said desired image by linking said desired image with said map data specified in position indicated by said positional data.

12. The mobile digital image acquisition apparatus as set forth in claim 11, wherein map data reference information of the positional information file includes link information to map data of a map including said position indicated by said positional data in its range, a format of the map data, and a size of the map data.

13. The mobile digital image acquisition method as set forth in claim 11, further comprising acquiring said map data from any node via the network based on said link information.

14. The mobile digital image acquisition method as set forth in claim 12, wherein map data of the positional information file has information indicating an absolute position of the map; and said method further comprising specifying a position indicated by said positional data on the map data based on information indicating said absolute position included in said map data.

15. The mobile digital image acquisition method as set forth in claim 12, wherein
map data reference information of the positional information file has information indicating an absolute position of map data indicated by said link information; and
said method further comprising specifying a position indicated by said positional data on the map data based on information indicating said absolute position included in said map data reference information.

16. The mobile digital image acquisition method as set forth in claim 12, wherein said data of a predetermined format includes a plurality of said map data reference information for one desired image and positional data and said method further comprising:
selecting one map data reference information from said plurality of map data reference information; and
acquiring one map data based on said selected map data reference information.

17. The mobile digital image acquisition method as set forth in claim 12, wherein said data of a predetermined format includes a plurality of said map data reference information for one desired image and positional data and said method further comprising:
acquiring any plurality of map data in map data indicated by said plurality of map data reference information; and
specifying said position and performing said predetermined processing on any one or more map data in said acquired plurality of map data in accordance with need.

18. The method of claim 10 wherein the text tag delimiters for delimiting positional information corresponding to geographic location of the first and second corner of the graphic image of the map further delimit text tag delimiters for separately delimiting longitude and latitude coordinates.

* * * * *